United States Patent [19]

Ohta et al.

[11] Patent Number: 5,571,636
[45] Date of Patent: Nov. 5, 1996

[54] NICKEL POSITIVE ELECTRODE FOR ALKALINE STORAGE BATTERY AND SEALED NICKEL-HYDROGEN STORAGE BATTERY USING NICKEL POSITIVE ELECTRODE

[75] Inventors: Kazuhiro Ohta, Neyagawa; Hiromu Matsuda, Kawabe-gun; Munehisa Ikoma, Shiki-gun; Nobuyasu Morishita, Fujiidera; Yoshinori Toyoguchi, Yao, all of Japan

[73] Assignee: Matsushita Electric Industrial Co., Ltd., Osaka, Japan

[21] Appl. No.: 439,930

[22] Filed: May 12, 1995

Related U.S. Application Data

[62] Division of Ser. No. 225,278, Apr. 8, 1994, Pat. No. 5,451,475.

[30] Foreign Application Priority Data

Apr. 28, 1993 [JP] Japan ................... 5-125376

[51] Int. Cl.$^6$ ................... H01M 4/02
[52] U.S. Cl. ................... 429/218; 429/59; 429/101; 429/219; 429/220; 429/223
[58] Field of Search ................... 429/59, 101, 212, 429/223, 219, 220, 218

[56] References Cited

U.S. PATENT DOCUMENTS

| | | | |
|---|---|---|---|
| 1,884,166 | 10/1932 | Otsuka et al. | 429/223 |
| 3,230,113 | 1/1966 | Herold | 429/223 |
| 3,790,454 | 2/1974 | Henderson et al. | 429/223 |
| 3,826,684 | 7/1974 | Pensabene | 136/28 |
| 4,000,005 | 12/1976 | McBreen | 429/212 |
| 4,130,696 | 12/1978 | Gunther | 429/223 |
| 4,952,465 | 8/1990 | Harris et al. | 429/60 |
| 5,244,758 | 9/1993 | Bronoel et al. | 429/223 |
| 5,348,822 | 9/1994 | Ovshinsky et al. | 429/223 |
| 5,451,475 | 9/1995 | Ohta et al. | 429/212 |

FOREIGN PATENT DOCUMENTS

| | | |
|---|---|---|
| 0460424 | 12/1991 | European Pat. Off. . |
| 0460425 | 12/1991 | European Pat. Off. . |
| 0490791 | 6/1992 | European Pat. Off. . |
| 0581275 | 2/1994 | European Pat. Off. . |
| 0587974 | 3/1994 | European Pat. Off. . |
| 0184830 | 6/1994 | European Pat. Off. . |
| 2738386 | 3/1978 | Germany . |
| 4-846841 | 7/1973 | Japan . |
| 57-157464 | 9/1982 | Japan . |
| 58-053157 | 3/1983 | Japan . |
| 61-104565 | 5/1986 | Japan . |

OTHER PUBLICATIONS

European search Report dated Oct. 4, 1994 (4 Oct. 1994) with regard to European Patent Application No. EP 94 10 5798 (5 sheets).
European Search Reports dated Dec. 8 and 9, 1994 (8 Dec. 1994 and 9 Dec. 1994) with regard to European Patent Application No. EP 94 10 5798 (8 sheets).

*Primary Examiner*—Maria Nuzzolillo
*Attorney, Agent, or Firm*—Panitch Schwarze Jacobs & Nadel, P.C.

[57] ABSTRACT

A nickel positive electrode for an alkaline storage battery includes an active material mixture and a conductive support. The active material mixture, which is composed mainly of nickel hydroxide, additionally contains nickel powder, a second powder compound and at least one of cobalt, cobalt hydroxide and cobalt oxide. The nickel powder has a specific surface area of from 0.1 to 3 m$^2$/g and an average particle diameter of from 0.1 to 15 micrometers, and the second powder compound contains at least one element including Ca, Sr, Ba, Cu, Ag or Y. A sealed nickel-hydrogen storage battery may incorporate the nickel positive electrode.

10 Claims, 8 Drawing Sheets

Average particle diameter of nickel powder (μm)

FIG.8

NICKEL POSITIVE ELECTRODE FOR ALKALINE STORAGE BATTERY AND SEALED NICKEL-HYDROGEN STORAGE BATTERY USING NICKEL POSITIVE ELECTRODE

CROSS-REFERENCED TO RELATED APPLICATION

This is a division of application Ser. No. 08/225,278, filed Apr. 8, 1994, now U.S. Pat. 5,451,475.

BACKGROUND OF THE INVENTION

1. Field of the Invention

The present invention relates to an improved nickel positive electrode for an alkaline storage battery, and also to a sealed type nickel-hydrogen storage battery using the nickel positive electrode.

2. Description of the Related Art

Recent trend for high value-added and down-sized portable apparatus has significantly enhanced the requirement for high energy density secondary cells. Development of new secondary cells having a high energy density is also highly required as a battery of electric vehicles. Alkaline storage batteries recently developed to meet these demands include a high-capacity nickel-cadmium storage battery with a conventional sintered nickel positive electrode, and a high energy-density nickel-cadmium storage battery with a foamed nickel positive electrode having a capacity 30 to 60% higher than that of the conventional electrode. Another example is a nickel-hydrogen storage battery using a hydrogen storage alloy as a negative electrode, which has a higher capacity than the nickel-cadmium storage batteries.

In such high-capacity alkaline storage batteries, nickel hydroxide powder is closely packed into a sintered nickel porous substrate, a three-dimensional foamed nickel porous substrate having the high porosity of not less than 90% or a nickel fiber porous substrate in order to improve the energy density of the positive electrode. The closely packed nickel hydroxide has improved the energy density to 450 to 500 mAh/cm$^3$ for the recent sintered nickel positive electrodes and to 550 to 650 mAh/cm$^3$ for the foamed nickel positive electrodes, compared to the energy density of 400 to 450 mAh/cm$^3$ for the conventional sintered nickel positive electrodes.

In such positive electrodes prepared by closely packing nickel hydroxide powder in a sintered nickel porous substrate, a foamed nickel porous substrate or a nickel fiber porous substrate, the packing density is increased by application of pressure. Application of the pressure, however, causes expansion of electrode plates and compresses separators each placed between a positive electrode and a negative electrode in the course of repetitive charging and discharging. The compression of the separators presses out an electrolyte solution included in the separators which makes a significant contribution to charge and discharge characteristics, thus deteriorating the discharge characteristics. A battery is sometimes discharged to approximately 0 V by an accidental continuous power-on of a portable apparatus. Repeated charging and discharging of such a battery significantly lowers the discharge voltage and increases the internal impedance.

The positive electrode prepared by closely packing nickel hydroxide powder in a sintered nickel porous substrate, a foamed nickel porous substrate or a nickel fiber porous substrate has a high energy density at ordinary temperatures but has a relatively low energy density in a high-temperature atmosphere. Namely, the merit of the high energy density can not be exerted in a wide temperature range. Charging under a high-temperature atmosphere generates oxygen simultaneously with a discharge reaction of converting nickel hydroxide to nickel oxyhydroxide. In other words, this decreases the overvoltage for evolution of oxygen at the positive electrode and prevents the discharge reaction of converting nickel hydroxide to nickel oxyhydroxide, thus lowering the utilization of nickel hydroxide.

Several methods have been proposed to solve the above-mentioned problems:

(1) A method of adding cadmium oxide powder or cadmium hydroxide powder to a positive electrode;

(2) A method of making a cadmium oxide contained in nickel hydroxide powder (disclosed in Japanese Laid-Open Patent No. 61-104565); and (3) A method of adding a powdery compound of a IIa group element, such as, calcium hydroxide to a sintered nickel positive electrode (disclosed in Japanese Laid-Open Patent No. 48-46841 and U.S. Pat. No. 3,826,684).

An active material mixture supported by a conductive support such as a sintered nickel porous substrate, a foamed nickel porous substrate or a nickel fiber porous substrate includes metal cobalt powder for enhancing the utilization of the active material and metal nickel powder as a conductive agent. Cobalt hydroxide or cobalt oxide may be used in place of the metal cobalt powder. In the positive electrode including such an actlye materlal mixture, repeated charging and discharging cycles having a large discharge depth, for example, discharge to approximately 0 V, lower the discharge voltage and increase the internal impedance to shorten the cycle life. This problem can not be solved by simply adjusting the quantity of metal cobalt powder or metal nickel powder added to the positive electrode.

In the method (1) or (2), a cadmium oxide is included in or mixed with nickel hydroxide powder to improve the utilization of nickel hydroxide in a high-temperature atmosphere. Addition of the cadmium oxide, however, improves the utilization of nickel hydroxide only to approximately 80% in the high-temperature atmosphere. A larger quantity of the cadmium oxide included in or mixed with nickel hydroxide powder is essential for further improvement of the utilization of nickel hydroxide in the high-temperature atmosphere. While actually improving the utilization of nickel hydroxide to approximately 90% in the high-temperature atmosphere, the large quantity of the cadmium oxide lowers the utilization of nickel hydroxide at ordinary temperatures. Addition of heavy metal, cadmium compounds is not favorable for protection of the environment.

In the method (3), a sintered nickel positive electrode is immersed first in an aqueous solution of calcium nitrate and then in an aqueous solution of sodium hydroxide. Calcium hydroxide thus precipitated is added to the positive electrode to improve the utilization of nickel hydroxide in a high-temperature atmosphere. Like the above methods (1) and (2), addition of calcium hydroxide improves the utilization of nickel hydroxide in the high-temperature atmosphere while lowering the utilization of nickel hydroxide at ordinary temperatures. In the method (3), calcium hydroxide is added to the sintered nickel positive electrode by immersing the electrode in a calcium nitrate solution. This causes the residual nitrates to exist in the nickel positive electrode. In a sealed battery with such a sintered nickel positive electrode, the residual nitrates undesirably increase the self discharge.

Addition of calcium hydroxide powder to the paste-type nickel positive electrode does not improve the utilization at ordinary and high temperatures.

SUMMARY OF THE INVENTION

One object of the present invention is accordingly to provide an improved nickel positive electrode for alkaline storage batteries, which is manufactured by a simple process, but has excellent discharge characteristics and realizes favorable utilization of nickel hydroxide in an atmosphere of a wide temperature range.

Another object of the present invention is to provide a nickel positive electrode for alkaline storage batteries, which has a sufficiently long cycle life even under conditions of charging and discharging cycles with a large discharge depth.

Still another object of the present invention is to provide a sealed nickel-hydrogen storage battery having a high energy density and a sufficiently long cycle life.

According to the present invention, a nickel positive electrode for an alkaline storage battery comprises an active material mixture mainly composed of nickel hydroxide and a conductive support, and the active material mixture contains at least one member selected from the group consisting of cobalt, cobalt hydroxide and cobalt oxide, and carbon powder having an interplanar spacing "d" of a (002) plane such that $3.35 \text{ Å} < d \leq 3.45 \text{ Å}$.

In a preferable embodiment of the present invention, the active material mixture further contains a powdery compound of at least one element selected from the group consisting of Ca, Sr, Ba, Cu, Ag and Y.

The present invention is also directed to a nickel positive electrode for an alkaline storage battery which includes an active material mixture mainly composed of nickel hydroxide and a conductive support, and the active material mixture contains at least one member selected from the group consisting of cobalt, cobalt hydroxide and cobalt oxide, nickel powder having a specific surface area of from 0.1 to 3 $m^2/g$ and an average particle diameter of from 0.1 to 15 micrometer, and a powdery compound of at least one element selected from the group consisting of Ca, Sr. Ba, Cu, Ag and Y.

Preferable examples of the compound include $Ca(OH)_2$, $CaO$, $CaF_2$, $CaS$, $CaSO_4$, $CaSi_2O_5$, $CaC_2O_4$, $CaWO_4$, $SrCO_3$, $Sr(OH)_2$, $BaO$, $Cu_2O$, $Ag_2O$, $Y_2(CO_3)_3$ and $Y_2O_3$.

A sealed nickel-hydrogen storage battery of the present invention includes any nickel positive electrode described above, a negative electrode including a hydrogen storage alloy which electrochemically absorbs and desorbs hydrogen, a separator, an electrolyte solution consisting of an alkaline aqueous solution and a sealed container having positive and negative terminals and a resettable safety valve.

In a preferable embodiment of the present invention, the content of the carbon powder in the active material mixture is from 0.1 to 8 parts by weight per 100 parts by weight of the nickel hydroxide.

The preferable carbon powder is flake graphite powder.

In another preferable embodiment of the invention, the content of the powdery compound in the active material mixture selected from the group consisting of $Ca(OH)_2$, $CaO$, $CaF_2$, $CaS$, $CaSO_4$, $CaSi_2O_5$, $CaC_2O_4$, $CaWO_4$, $SrCO_3$, $Sr(OH)_2$, $BaO$, $Cu_2O$, $Ag_2O$, $Y_2(CO_3)_3$ and $Y_2O_3$, is from 0.1 to 5 parts by weight per 100 parts by weight of the nickel hydroxide.

The content of the nickel powder is preferably from 0.1 to 8 parts by weight per 100 parts by weight of the nickel hydroxide.

While the novel features of the present invention are set fourth particularly in the appended claims, the invention, both as to organization and content, will be better understood and appreciated, along with other objects and features thereof, from the following detailed description taken in conjunction with the appended drawings.

It will be recognized that some or all of the Figures are schematic representations for purposes of illustration and do not necessarily depict the actual relative sizes or locations of the element shown.

DETAILED DESCRIPTION OF THE INVENTION

The present invention is directed to a nickel positive electrode, or more specifically to a paste-type nickel positive electrode comprising an active material mixture, which contains nickel hydroxide as a primary component, at least one member selected from the group consisting of cobalt, cobalt hydroxide and cobalt oxide, and carbon powder having an interplanar spacing of a (002) plane as specified above. The positive electrode of the present Invention contains the cobalt or cobalt compound for constituting a conductive network and the carbon powder for supporting the conductive network, which efficiently improve the conductivity and the charge efficiency. The carbon powder specified as above inhibits oxidation of carbon ($C+O_2 \rightarrow CO_2$) at the time of charging, thus allowing the positive electrode to maintain the high conductivity. The enhanced conductive network allows the positive electrode to have a favorable long cycle life even under conditions of expansion and contraction of an electrode plate due to discharge with a large discharge depth up to approximately 0.1 V and subsequent repetition of charging and discharging cycles.

The paste-type nickel positive electrode of the present invention further contains at least one member selected from the group consisting of $Ca(OH)_2$, $CaO$, $CaF_2$, $CaS$, $CaSO_4$, $CaSi_2O_5$, $CaC_2O_4$, $CaWO_4$, $SrCO_3$, $Sr(OH)_2$, $BaO$, $Cu_2O$, $Ag_2O$, $Y_2(CO_3)_3$ and $Y_2O_3$. These compounds are adsorbed to the surface of the nickel hydroxide functioning as an active material, and increase an overvoltage for evolution of oxygen, which is a competitive reaction in charging under a high-temperature atmosphere expressed as reaction formula (1). As a result, a charge reaction of nickel hydroxide to nickel oxyhydroxide expressed as reaction formula (2) sufficiently proceeds to improve the utilization of the nickel positive electrode in the high-temperature atmosphere:

$$2OH^- \rightarrow \tfrac{1}{2}O_2 + H_2O + e^- \quad (1)$$

$$Ni(OH)_2 + OH^- \rightarrow NiOOH + H_2O + e^- \quad (2)$$

The paste-type nickel positive electrode of the present invention which contains at least one of cobalt, cobalt hydroxide and cobalt oxide may further contain carbon powder having an interplanar spacing of a (002) plane as specified above, or nickel powder having a specific surface area and an average particle diameter as specified above and at least one powdery compound such as $Ca(OH)_2$. The synergism of the cobalt or cobalt compound for constituting a conductive network and the carbon powder or mixture of the nickel powder and the powdery compound such as $Ca(OH)_2$ for supporting the conductive network increases the overvoltage for evolution of oxygen, which is a competitive reaction in charging under a high-temperature atmosphere. This results in improvement of the utilization of the nickel positive electrode under the high-temperature atmosphere in the same manner as above. The improved conductivity maintains the high utilization of the nickel positive electrode under an atmosphere of ordinary or low temperatures.

The structure described gives the nickel positive electrode preferable discharge characteristics and a sufficiently long cycle life, and improves the utilization of nickel hydroxide under an atmosphere of a wide temperature range from the ordinary to high temperatures. An appropriate amount of the powdery compound does not adversely affect the utilization of nickel hydroxide. The present invention accordingly gives a positive electrode having preferable discharge characteristics and excellent utilization of the active material in a wide temperature range, and an improved sealed nickel-hydrogen storage battery using the positive electrode.

The preferable range of the content of the carbon powder included in the active material mixture is from 0.1 to 8 parts by weight per 100 parts by weight of the nickel hydroxide. The content smaller than the above range does not properly exert the effects whereas the content greater than the above range lowers the energy density. Flake graphite powder which gives significantly high conductivity is preferable as the carbon powder.

The conductive support included in the positive electrode may be a foamed nickel porous substrate, a nickel fiber porous substrate, a sintered nickel porous substrate or a three-dimensional porous substrate such as punching metal. Other examples of the conductive support include a nickel flat plate or a nickel-plated iron foil. In the case of the foamed nickel porous substrate, the preferable surface density of the porous substrate is determined to be from 200 to 700 $g/m^2$ from the viewpoint of current collecting characteristics.

From the standpoints of the uniform filling and formation of the conductive network, the nickel hydroxide is preferably spherical nickel hydroxide having an average particle diameter of from 1 to 30 micrometer.

The preferable content of the powdery compound, such as $Ca(OH)_2$, included in the active material mixture is from 0.1 to 5 parts by weight per 100 parts by weight of the nickel hydroxide. The content smaller than the above range does not properly exert the effects whereas the content greater than the above range lowers the energy density. The content of the nickel powder is preferably from 0.1 to 8 parts by weight per 100 parts by weight of the nickel hydroxide.

The structure and effects of the invention will be more apparent through the following description of the preferred examples.

EXAMPLE 1

Spherical nickel hydroxide powder, cobalt powder, cobalt hydroxide powder and carbon powder having a variety of (002) plane-interplanar spacing "d" were weighed at a weight ratio of 100:3:2.5:4, sufficiently mixed with each other and kneaded with water to a paste. Subsequently, the paste was applied to a foamed nickel substrate used as a support having a thickness of 1.6 mm, a porosity of 95% and a surface density of 600 $g/m^2$. Each substrate filled with the paste was dried, pressure-molded and immersed in an aqueous dispersion of a fluorocarbon resin powder. The immersed substrate was dried again, and cut into a nickel positive electrode having a size of 90×70 mm and a thickness of 0.9 mm, with a packing density of nickel hydroxide of approximately 600 mAh/cc and a theoretical capacity of 3.5 Ah. Half-cells were then prepared by placing one plate of the respective nickel positive electrodes thus prepared, via separators, between two plates of a known hydrogen storage alloy negative electrode having a theoretical capacity greater than that of the positive electrode. An aqueous solution of potassium hydroxide having a specific gravity of 1.30 was used as an electrolyte solution in each half-cell.

The half-cells thus prepared were subjected to repeated charging and discharging cycles at a temperature of 20° C. The depth of charge was 120% at five-hour rate (0.7A). Discharge was continued until the cell voltage was lowered to 0.1 V at a constant resistance corresponding to two-hour rate (1.75 A).

Figure 1:
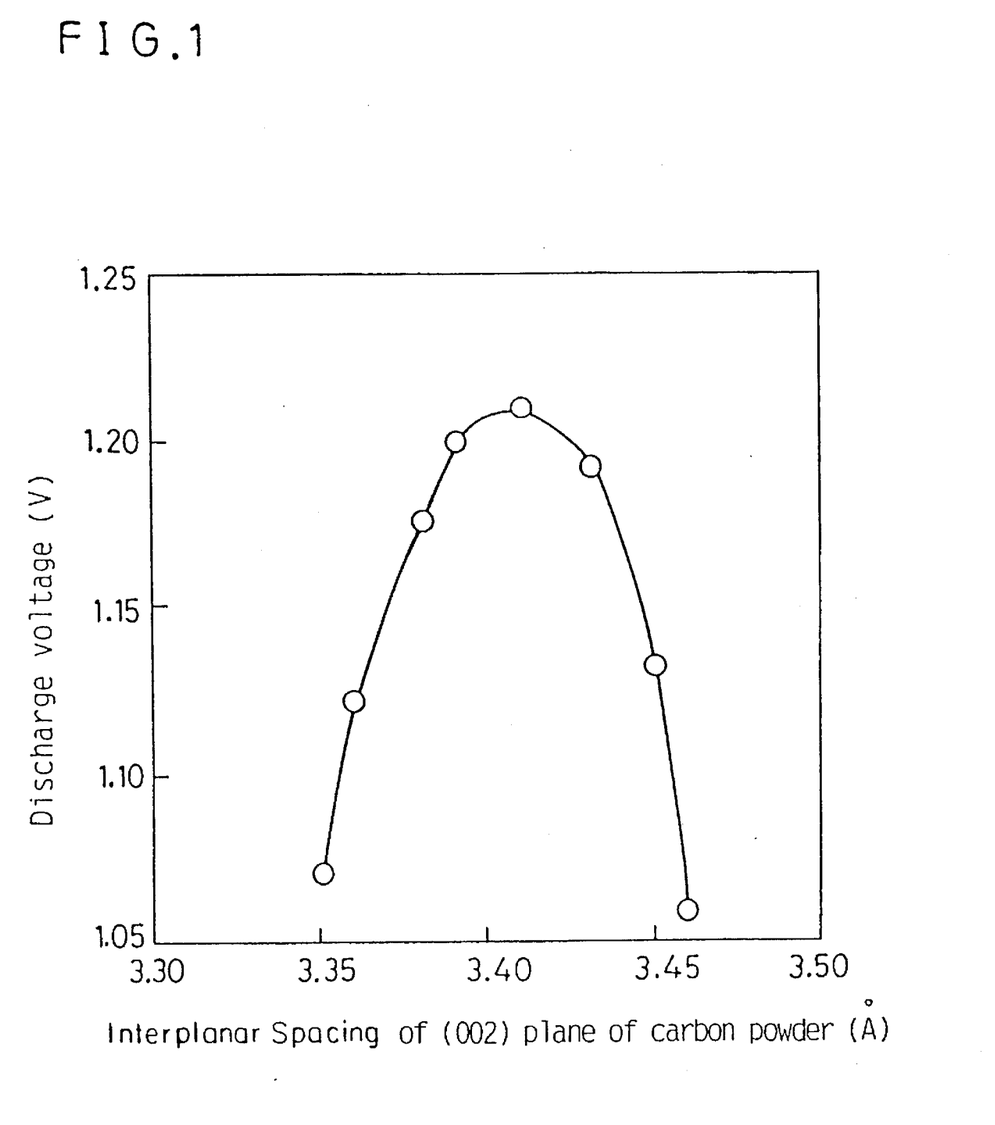
FIG. 1 shows the discharge voltage plotted against the interplanar spacing of carbon powder included in each positive electrode.

FIG. 1 shows the discharge voltage plotted against the interplanar spacing "d" of the (002) plane of carbon powder when the cell was discharged to 1.75 Ah at the constant resistance after 200 cycles. It is found clearly from FIG. 1 that the cells containing carbon powder with the (002)-plane interplanar spacing "d" such that 3.35Å<d≦3.45 Å have high discharge voltages.

A positive electrode "a" in accordance with the present invention was prepared by the process above with carbon powder having the (002)-plane interplanar spacing "d" of 3.41 Å.

A positive electrode "b" containing conventional carbonyl nickel powder instead of the carbon powder and another positive electrode "c" containing no carbon powder were prepared as comparative examples in the same manner as above.

A sealed battery was configured with one of the above positive electrodes and a hydrogen storage alloy negative electrode prepared in the following manner. A hydrogen storage alloy represented by the formula: $MmNi_{3.55}Mn_{0.4}Al_{0.3}Co_{0.75}$ (where Mm is a misch metal containing 10% by weight of lanthanum) was kneaded with water to a paste. The paste was then applied to a foamed nickel substrate used as a support having a thickness of 1.0 mm, a porosity of 93% and a surface density of 600 g/m². The substrate filled with the paste was dried, pressure-molded, and cut into a hydrogen storage alloy negative electrode having a size of 90×70 mm and a thickness of 0.6 mm, with a packing density of nickel hydroxide of approximately 1,280 mAh/cc and a theoretical capacity of 4.5 Ah. Each test battery included ten plates of the positive electrode and eleven plates of the negative electrode.

Figure 2:
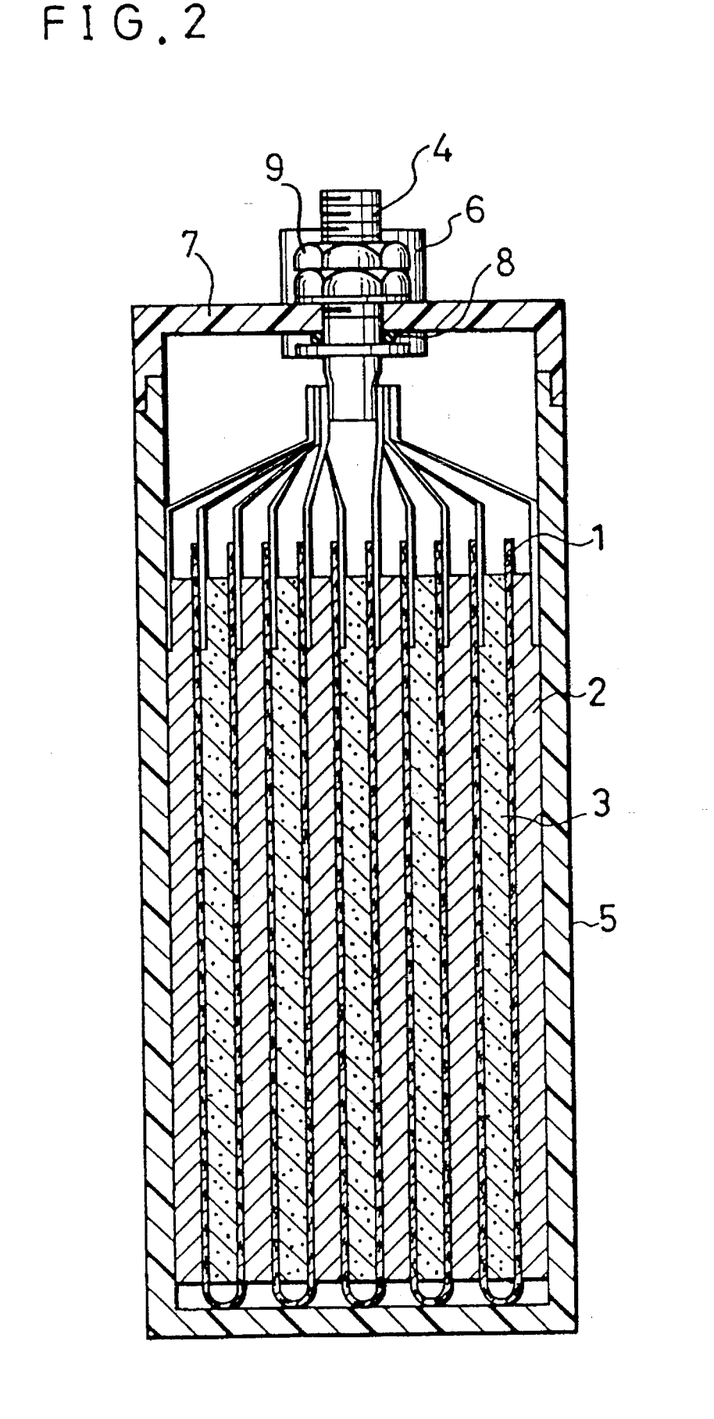
FIG. 2 is a vertical sectional view schematically illustrating a sealed nickel-hydrogen storage battery embodying the Invention.

Each sealed battery had a configuration described hereinafter. As shown in FIG. 2, negative electrodes 2 and positive electrodes 8 were laid one upon another via separators 1 of sulfonated polypropylene non-woven fabrics. The negative electrodes 2 were placed on either end of the electrode-layer. Leads of the negative electrodes 2 were connected to a negative terminal 4 made of nickel whereas leads of the positive electrodes 8 were connected to a positive terminal (not shown) made of nickel by spot welding. The layered plates were inserted in a case 5 (height: 108 mm, length: 69 mm, width: 18 mm) of acrylonitrile-styrene copolymer resin having a thickness of 3 mm. The case 5 was then partly filled with 63 cc of an aqueous solution of potassium hydroxide having a specific gravity of 1.8 used as an electrolyte solution. A sealing plate 7 of acrylonitrile-styrene copolymer resin with a safety valve 6 which is operable at two atmospheric pressure was fixed to the case 5 with an epoxy resin. The positive terminal and the negative terminal 4 were air-tightly attached to the sealing plate 7 via O rings 8 and nuts 9.

Three sealed nickel-hydrogen storage batteries A, B and C thus prepared to have a theoretical capacity of 35 Ah respectively included the positive electrodes "a", "b" and "c".

The batteries A, B and C were tested for cycle life in an atmosphere of 20° C. The depth of charge was 120% at five-hour rate (7A) whereas the depth of discharge was 100% at two-hour rate (17.5 A).

Figure 3:
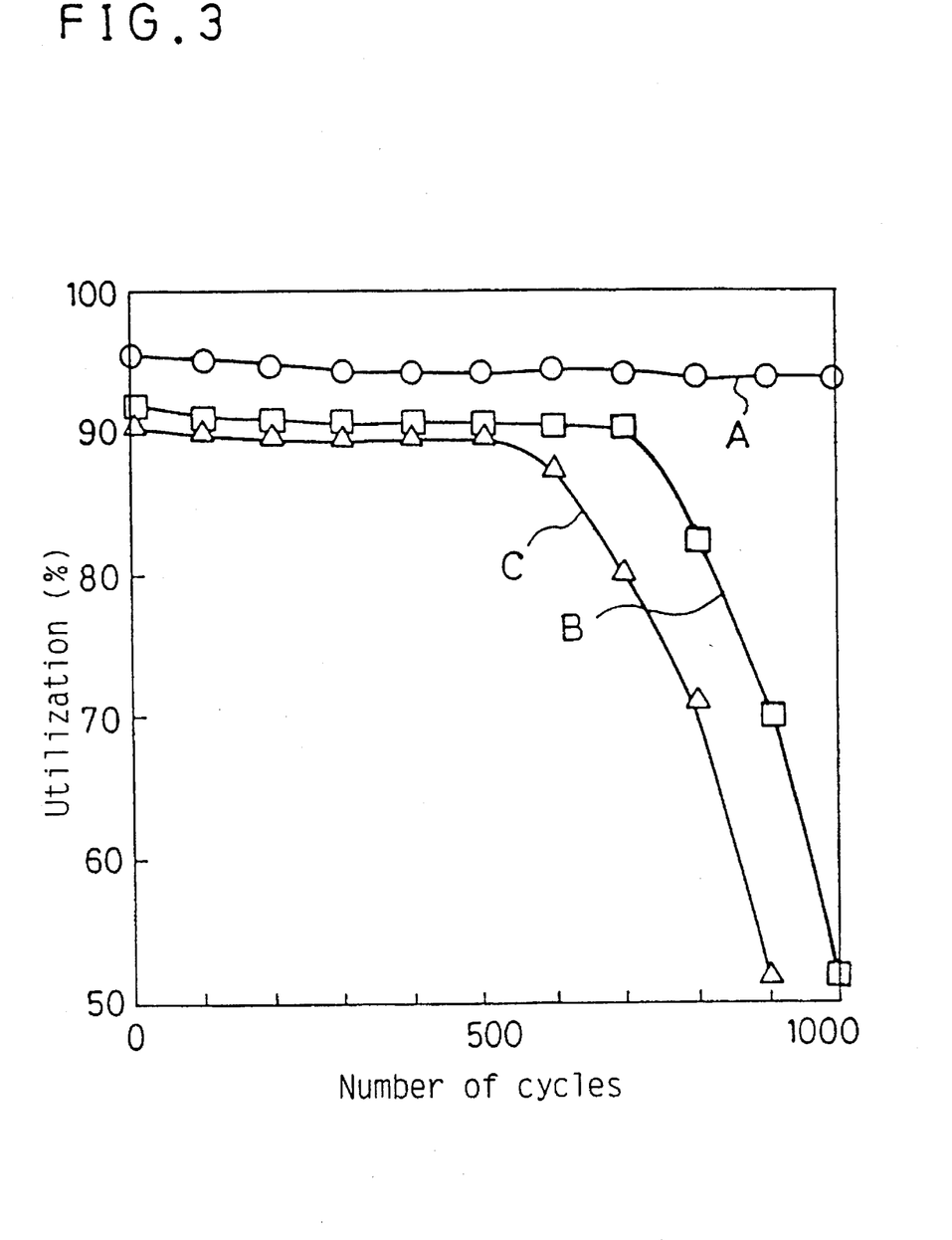
FIG. 3 shows the cycle life characteristics of nickel-hydrogen storage batteries including a variety of positive electrodes.

FIG. 3 shows the relationship between the utilization and the number of charging and discharging cycles in each of the batteries A, B and C. The battery A had the utilization of from 93 to 95% until 1,000 cycles. In the battery C, on the other hand, the utilization was approximately 90% until 500 cycles and then abruptly dropped. In the battery B, the utilization was approximately 914 until 700 cycles and then abruptly dropped.

These results clearly show that the battery A in accordance with the invention has a sufficiently long cycle life even under charge and discharge conditions with the large discharge depth. Such a favorable effect is not obtained under the deep discharge conditions without carbon powder having the (002) plane interplanar spacing specified as above. The carbon powder having the (002) interplanar spacing specified as above inhibits oxidation of carbon ($C+O_2 \rightarrow CO_2$) at the time of charging, thus maintaining high conductivity and preventing generation of τ-nickel oxyhydroxide, a non-dischargeable substance.

EXAMPLE 2

Nickel hydroxide powder, cobalt powder, cobalt hydroxide powder, carbon powder having a variety of (002) plane-interplanar spacings "d" and strontium hydroxide powder were weighed at a weight ratio of 100:3:2.5:4:1, sufficiently mixed with each other and kneaded with water to a paste. At a subsequent step, the paste was applied to a foamed nickel substrate used as a support having a thickness of 1.6 mm, a porosity of 95% and a surface density of 600 g/m². Each substrate filled with the paste was dried, pressure-molded, and immersed in an aqueous dispersion of a fluorocarbon resin powder. The immersed substrate was dried again, and cut into a nickel positive electrode having a size of 90×70 mm and a thickness of 0.9 mm, with a packing density of nickel hydroxide of approximately 600 mAh/cc and a theoretical capacity of 3.5 Ah. Half-cells were then prepared by placing one plate of the respective nickel positive electrodes thus prepared, via separators, between two plates of a known hydrogen storage alloy negative electrode having a theoretical capacity greater than that of the positive electrode. An aqueous solution of potassium hydroxide having a specific gravity of 1.30 was used as an electrolyte solution in each half-cell.

These half-cells were tested under the conditions of 15-hour charging at ten-hour rate (0.35 A) and discharging to a cut off voltage of 1 V at five-hour rate (0.70 A) and 20° C. Charging was conducted at atmospheric temperatures of −20° C., 0° C., 20° C. and 45° C. (hereinafter referred to as charge temperature).

Figure 4:
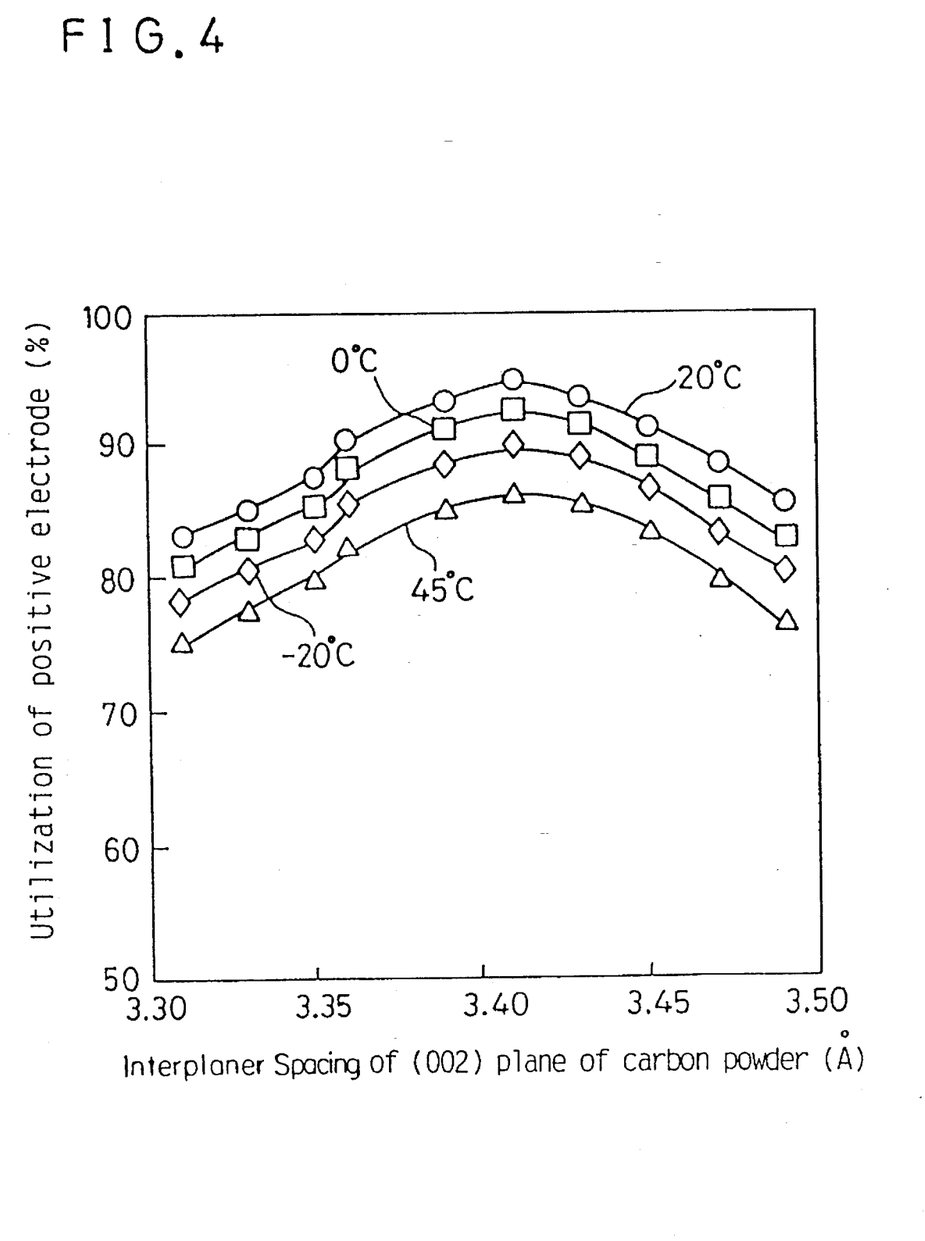
FIG. 4 shows the relationship between the utilization and the interlayer spacing of carbon powder included in each positive electrode at various charge temperatures.

FIG. 4 shows the relationship between the utilization and the (002) plane interplanar spacing of carbon powder included in each positive electrode at the various charge temperatures. It is found from FIG. 4 that the positive electrodes containing carbon powder with the (002)-plane interplanar spacing "d" of greater than 3.35 Å and not greater than 3.45 Å have high utilization.

A positive electrode "d" in accordance with the invention was prepared by the process above with carbon powder having the (002)-plane interplanar spacing "d" of 3.41 Å.

A positive electrode "e" containing no strontium hydroxide powder, another positive electrode "f" containing no carbon powder, and still another positive electrode "g" containing neither strontium hydroxide powder nor carbon powder were prepared as comparative examples in the same manner as above.

Half-cells were prepared with these positive electrodes "d", "e", "f" and "g" in the same manner as above, and then tested under the same conditions as above.

Figure 5:
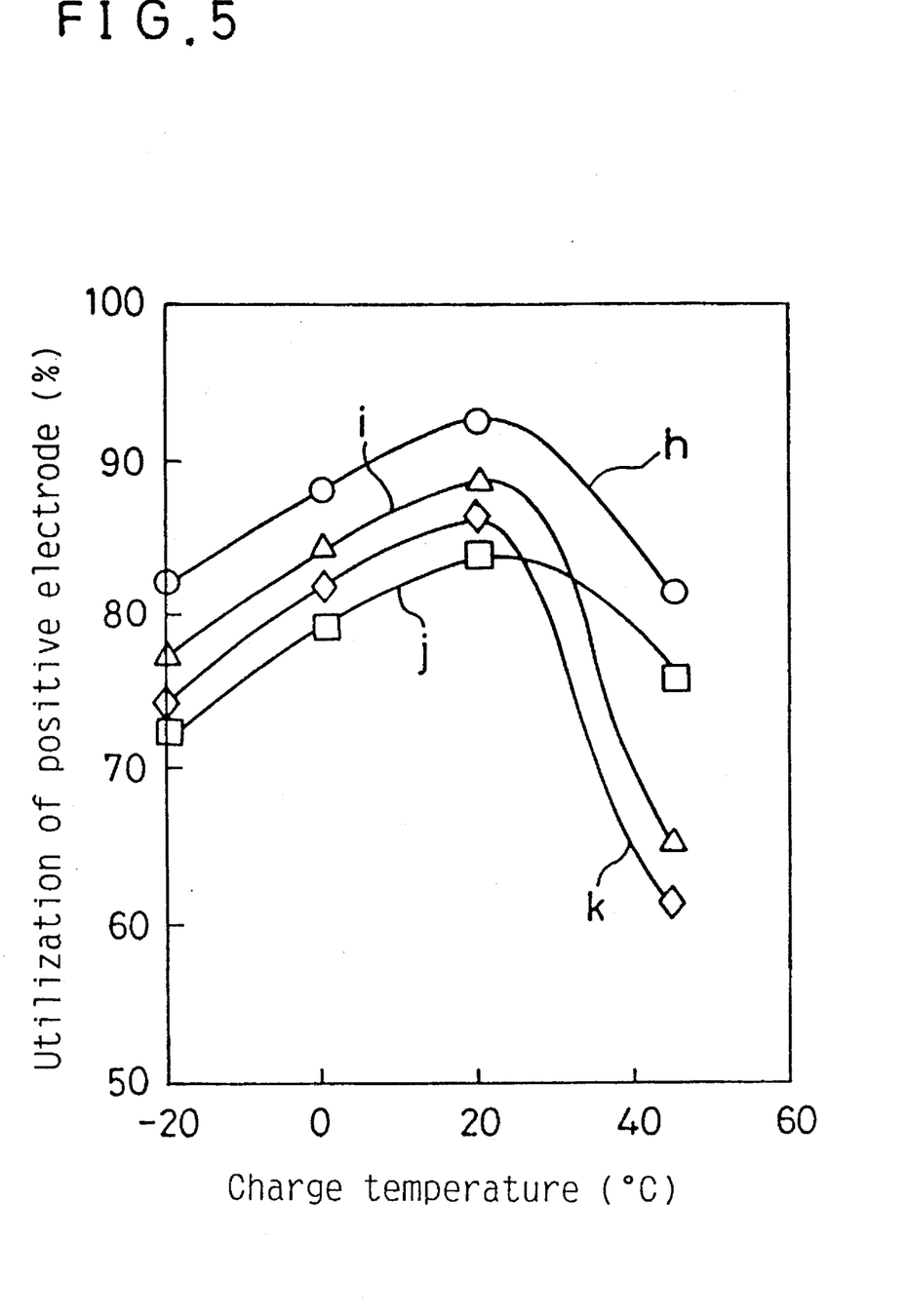
FIG. 5 shows the relationship between the charge temperature and the utilization in a variety of positive electrodes.

FIG. 5 shows the relationship between the charge temperature and the utilization in the variety of positive electrodes. As clearly shown in FIG. 5, the positive electrode "d" in accordance with the invention exerted excellent properties in a wide temperature range. Both strontium hydroxide powder and carbon powder were found essential for the sufficient utilization. Strontium hydroxide powder included in the positive electrode improved the characteristics at high temperatures but had poor conductivity in the range of low through ordinary temperatures. Carbon powder included in the positive electrode, on the other hand, improved the characteristics in the range of low through ordinary temperatures but had poor conductivity at high temperatures.

The same test was conducted for a variety of positive electrodes containing, in place of strontium hydroxide powder used in this example, $Ca(OH)_2$, $CaO$, $CaF_2$, $CaS$, $CaSO_4$, $CaSi_2O_5$, $CaC_2O_4$, $CaWO_4$, $SrCO_3$, $BaO$, $Cu_2O$, $Ag_2O$, $Y_2(CO_3)_3$ or $Y_2O_3$. In any positive electrode thus prepared, the utilization was 70% or more in charging at 45° C. In charging at −20° C., 0° C. and 20° C., the utilization was not less than 82%, not less than 88% and not less than 93%, respectively.

EXAMPLE 3

Nickel hydroxide powder, cobalt powder, cobalt hydroxide powder, nickel powder having a variety of specific surface areas and average particle diameters, and yttrium oxide powder were weighed at a weight ratio of 100:3:2.5:4:1, sufficiently mixed with each other and kneaded with water to a paste. At a subsequent step, the paste was applied to a foamed nickel substrate used as a support having a thickness of 1.6 mm, a porosity of 95%, and a surface density of 600 g/m². Each substrate filled with the paste was dried, pressure-molded, and immersed in an aqueous dispersion of fluorocarbon resin powder. The immersed substrate was dried again, and cut into a nickel positive electrode having a size of 90×70 mm and a thickness of 0.9 mm, with a packing density of nickel hydroxide of approximately 600 mAh/cc and a theoretical capacity of 3.5 Ah. Half-cells were then prepared by placing one plate of the respective nickel positive electrodes thus prepared, via separators, between two plates of a known hydrogen storage alloy negative electrode having a theoretical capacity greater than that of the positive electrode. An aqueous solution of potassium hydroxide having a specific gravity of 1.30 was used as an electrolyte solution in each half-cell.

These half-cells were tested under the conditions of 15-hour charging at ten-hour rate (0.35 A) and discharging to a cut off voltage of 1 V at five-hour rate (0.70 A) and 20° C. Charging was conducted at temperatures of −20°C., 0° C., 20° C. and 45° C.

Figure 6:
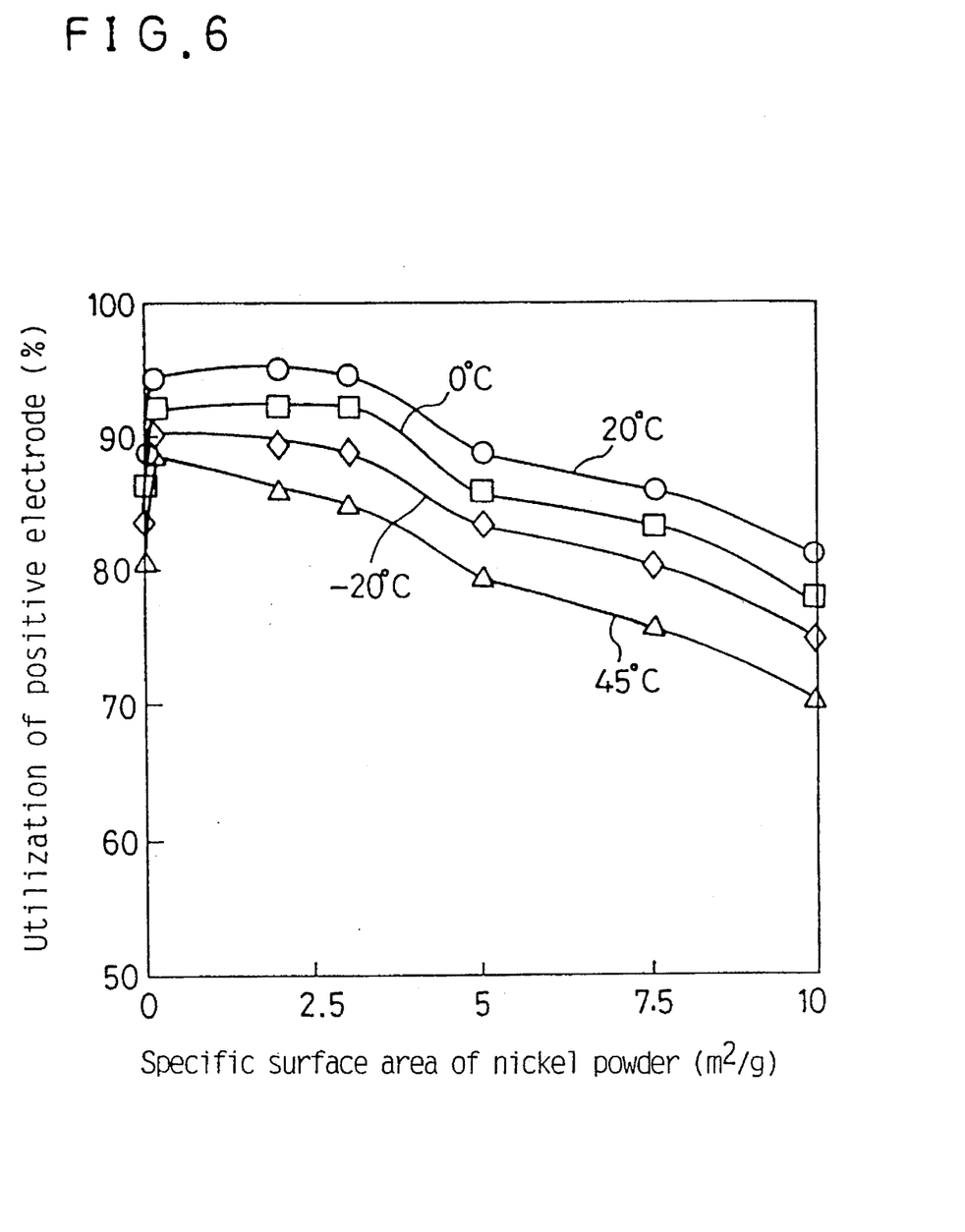
FIG. 6 shows the relationship between the utilization and the specific surface area of nickel powder included in each positive electrode at various charge temperatures.
Figure 7:
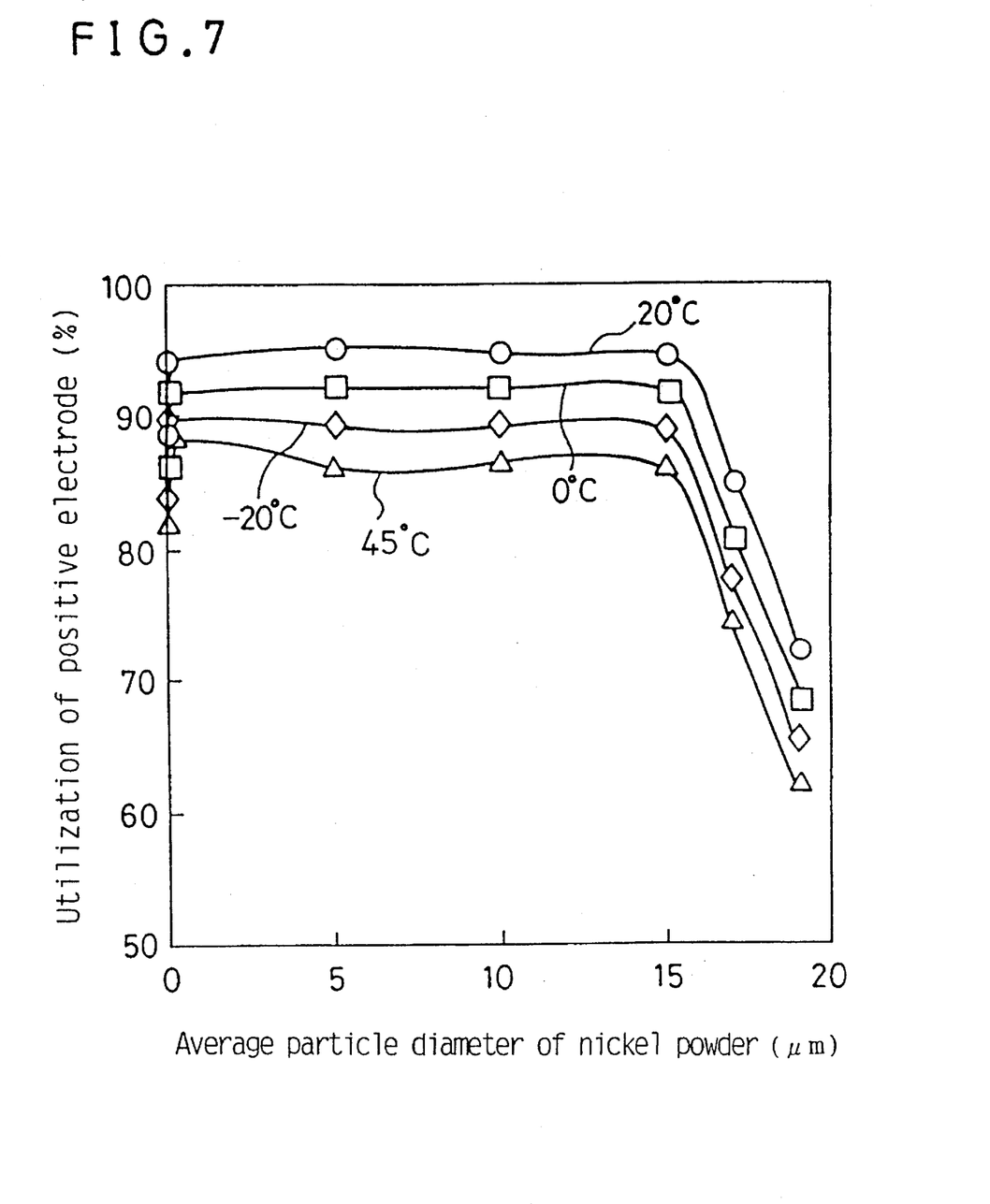
FIG. 7 shows the relationship between the utilization and the average particle diameter of nickel powder included in each positive electrode at various charge temperatures.

FIG. 6 shows the relationship between the utilization and the specific surface area (0.05 to 10 m²/g) of nickel powder included in each positive electrode at various charge temperatures. FIG. 7 shows the relationship between the utilization and the average particle diameter (0.05 to 18 micrometer) of nickel powder included in each positive electrode at various charge temperatures. It is found from FIG. 6 and FIG. 7 that the positive electrodes containing nickel powder having the specific surface area of from 0.1 to 3 m²/g and the average particle diameter of from 0.1 to 15 micrometer have high utilization.

A positive electrode "h" according to the invention was prepared by the process above with nickel powder having a specific surface area of 2 m²/g and an average particle diameter of 5 micrometer. A positive electrode "i" containing no yttrium oxide powder, another positive electrode "j" containing no nickel powder, and still another positive electrode "k" containing neither yttrium oxide powder nor nickel powder were prepared as comparative examples in the same manner as above.

Half-cells were prepared with these positive electrodes "h", "i", "j" and "k" in the same manner as above, and then tested under the same conditions as above.

Figure 8:
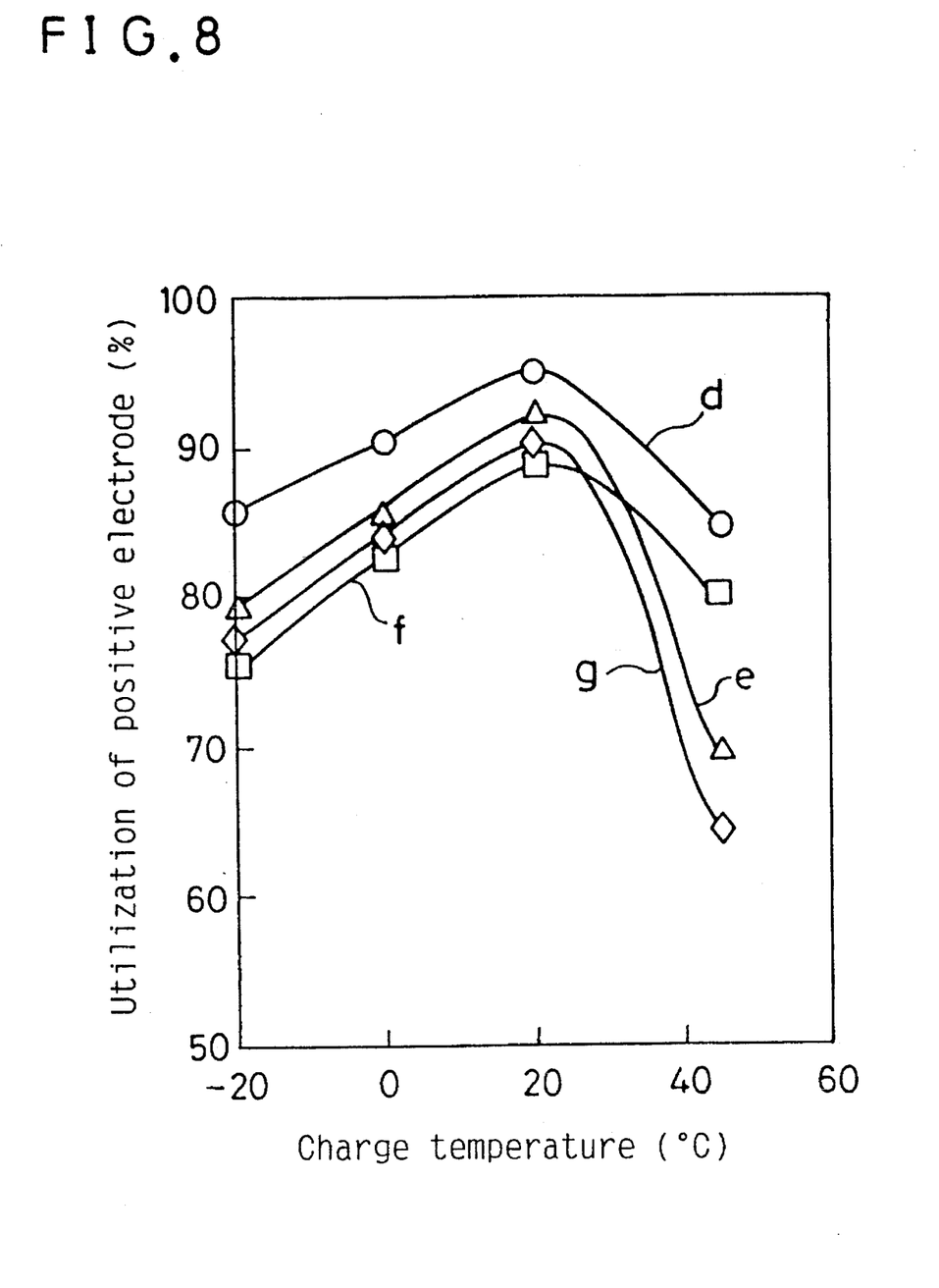
FIG. 8 shows the relationship between the charge temperature and the utilization in a variety of positive electrodes.

FIG. 8 shows the relationship between the charge temperature and the utilization in the variety of positive electrodes. As clearly shown in FIG. 8, the positive electrode "h" according to the invention exerted excellent properties in a wide temperature range. Both yttrium oxide powder and nickel powder are essential for the sufficient utilization.

Another powdery compound, such as $Ca(OH)_2$, may be used in place of the yttrium oxide powder to have the equivalent characteristics.

Sealed nickel-hydrogen storage batteries having excellent characteristics as that of Example 1 can be prepared by respectively combining the positive electrodes of Example 2 and Example 3 with the hydrogen storage alloy negative electrode described above.

Although the present Invention has been described in terms of the presently preferred embodiments, it is to be understood that such disclosures is not to be interpreted as limiting. Various alterations and modifications will no doubt become apparent to those skilled in the art to which the present invention pertains, after having read the above disclosure. Accordingly, it is lntended that the appended claims be interpreted as covering all alterations and modifications as fall within the true spirit and scope of the invention.

What is claimed is:

1. A nickel positive electrode for an alkaline storage battery comprising an active material mixture and a conductive support for said active material mixture, said active material mixture comprising predominantly nickel hydroxide, and further comprising nickel powder, a second powder compound, and at least one member selected from the group consisting of cobalt, cobalt hydroxide and cobalt oxide, said nickel powder having a specific surface area of from 0.1 to 3 m²/g and an average particle diameter of from 0.1 to 15 micrometers, and said second powder compound including at least one element selected from the group consisting of Ca, Sr, Ba, Cu, Ag, and Y.

2. A nickel positive electrode in accordance with claim 1, wherein said second powder compound is at least one member selected from the group consisting of $Ca(OH)_2$, $CaO$, $CaF_2$, $CaS$, $CaSO_4$, $CaSi_2O_5$, $CaC_2O_4$, $CaWO_4$, $SrCO_3$, $Sr(OH)_2$, $BaO$, $Cu_2O$, $Ag_2O$, $Y_2(CO_3)_3$ and $Y_2O_3$.

3. A nickel positive electrode in accordance with claim 1 wherein the content of said nickel powder included in said active material mixture is from 0.1 to 8 parts by weight per 100 parts by weight of said nickel hydroxide.

4. A nickel positive electrode in accordance with claim 1 wherein the content of said second powder compound included in said active material mixture is from 0.1 to 5 parts by weight per 100 parts by weight of said nickel hydroxide.

5. A sealed nickel-hydrogen storage battery comprising a nickel positive electrode, a negative electrode comprising a hydrogen storage alloy which electrochemically absorbs and desorbs hydrogen, a separator, an electrolyte solution consisting of an alkaline aqueous solution and a sealed container having positive and negative terminals and a resettable safety valve, Said nickel positive electrode comprising an active material mixture and a conductive support for said active material mixture, said active material mixture comprising predominantly nickel hydroxide, and further comprising nickel powder, a second powder compound, and at least one member selected from the group consisting of cobalt, cobalt hydroxide and cobalt oxide, said nickel powder having a specific surface area of from 0.1 to 3 m²/g and an average particle diameter of from 0.1 to 15 micrometers, and said second powder compound including at least one element selected from the group consisting of Ca, Sr, Ba, Cu, Ag, and Y.

6. A sealed nickel-hydrogen storage battery in accordance with claim 5, wherein said second powder compound is at least one member selected from the group consisting of $Ca(OH)_2$, $CaO$, $CaF_2$, $CaS$, $CaSO_4$, $CaSi_2O_5$, $CaC_2O_4$, $CaWO_4$, $SrCO_3$, $Sr(OH)_2$, $BaO$, $Cu_2O$, $Ag_2O$, $Y_2(CO_3)_3$ and $Y_2O_3$.

7. A nickel positive electrode in accordance with claim 2, wherein the content of said nickel powder included in said active material mixture is from 0.1 to 8 parts by weight per 100 parts by weight of said nickel hydroxide.

8. A nickel positive electrode in accordance with claim 2, wherein the content of said second powder compound included in said active material mixture is from 0.1 to 5 parts by weight per 100 parts by weight of said nickel hydroxide.

9. A nickel positive electrode according to claim 1, wherein said nickel hydroxide is nickel hydroxide powder.

10. A sealed nickel-hydrogen storage battery according to claim 5, wherein said nickel hydroxide is nickel hydroxide powder.

* * * * *